United States Patent [19]

Baudou et al.

[11] Patent Number: 5,742,937

[45] Date of Patent: Apr. 28, 1998

[54] HEAD EQUIPMENT WITH ISOSTATIC LINK BETWEEN SHELL AND OPTRONIC INSTRUMENTS

[75] Inventors: Joël Baudou, St Medard en Jalles; Vincent Vitte, Bordeaux, both of France

[73] Assignee: Sextant Avionique, Meudon La Foret, France

[21] Appl. No.: 397,365

[22] Filed: Mar. 2, 1995

[30] Foreign Application Priority Data

Mar. 11, 1994 [FR] France ................... 94 02862

[51] Int. Cl.$^6$ ................. A42B 3/06; G02B 23/00
[52] U.S. Cl. ................. 2/6.3; 2/6.8; 2/411
[58] Field of Search ................. 2/6.3, 6.2, 6.7, 2/6.8, 411, 422, 410, 424; 359/409, 410, 411, 815

[56] References Cited

U.S. PATENT DOCUMENTS

| | | | |
|---|---|---|---|
| 1,244,559 | 10/1917 | Stocks | 2/6.8 |
| 1,251,537 | 1/1918 | Kempny | 2/6.8 |
| 5,446,585 | 8/1995 | Morley et al. | 359/411 |

FOREIGN PATENT DOCUMENTS

| | | |
|---|---|---|
| 0 290 293 | 11/1988 | European Pat. Off. . |
| 0 475 679 | 3/1992 | European Pat. Off. . |
| 0 576 160 | 12/1993 | European Pat. Off. . |
| 2 677 604 | 12/1992 | France . |
| 2 254 160 | 9/1992 | United Kingdom . |

*Primary Examiner*—Peter Nerbun
*Attorney, Agent, or Firm*—Oblon, Spivak, McClelland, Maier & Neustadt, P.C.

[57] ABSTRACT

Disclosed is head equipment having a shell with flanks on each side of a plane of symmetry of the shell, an upper part and a rear part, and a rigid structure designed to bear an optronic device. The head equipment comprises linking assemblies to attach the structure and the shell to each other in a locally movable way. The linking assemblies are attached to the structure and to the shell and are capable of changing shape. The linking assemblies may be blocks of elastomer or pins attached to the structure, sliding in cylinders attached to the shell.

12 Claims, 6 Drawing Sheets

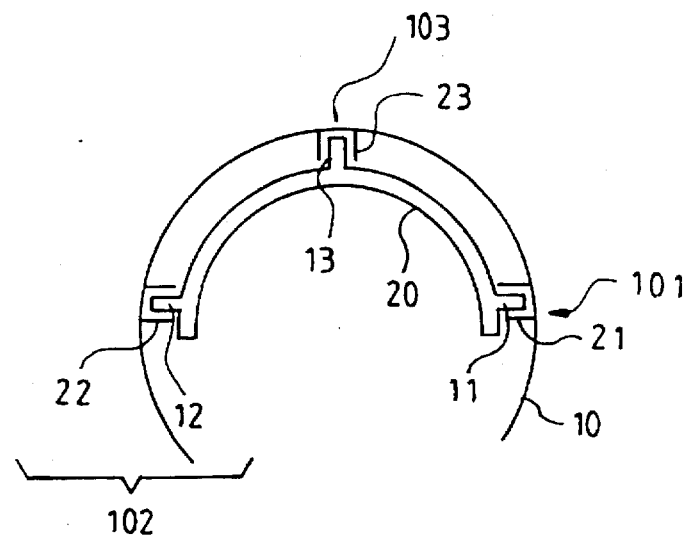
FIG.2a
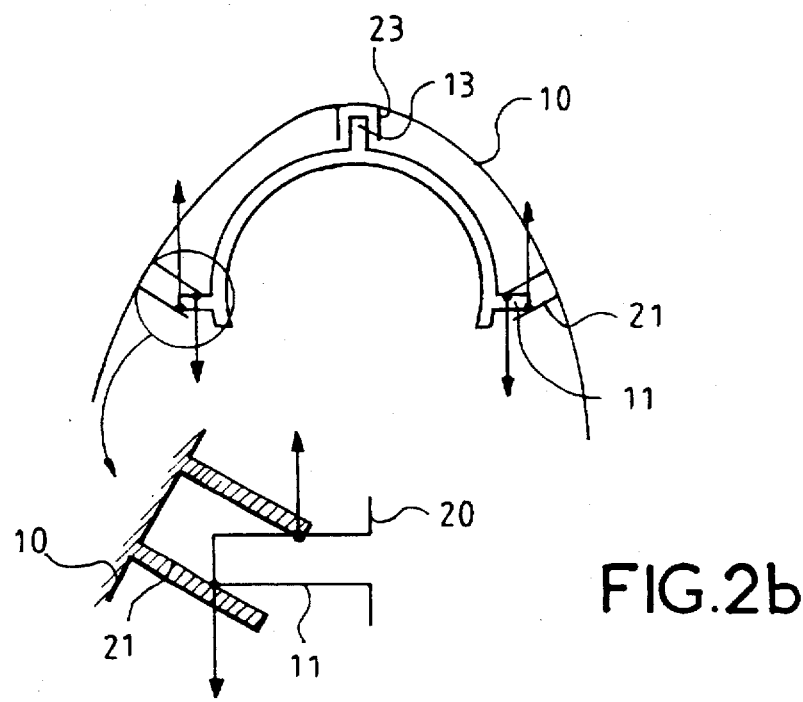
FIG.2b
FIG.2c

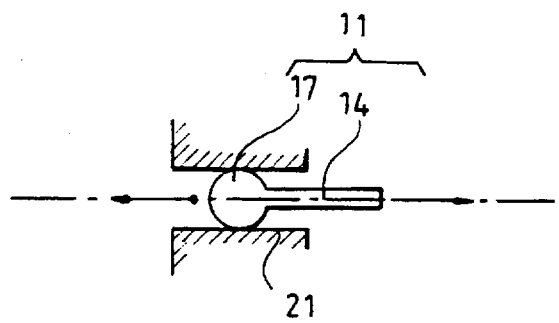
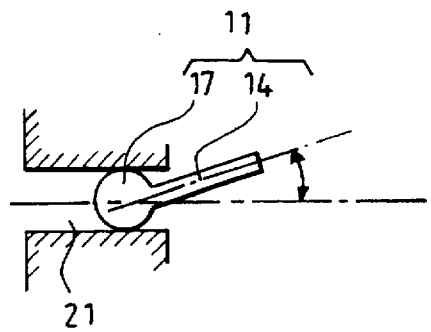
FIG.4a    FIG.4b
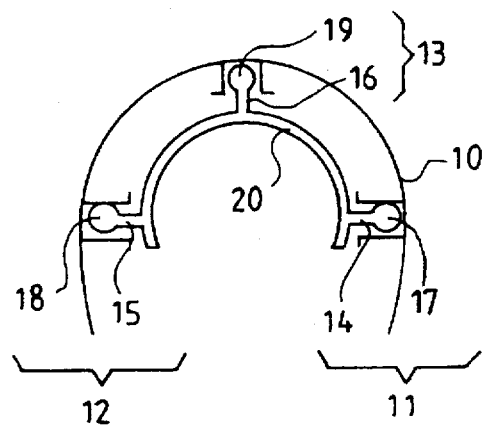
FIG.4c
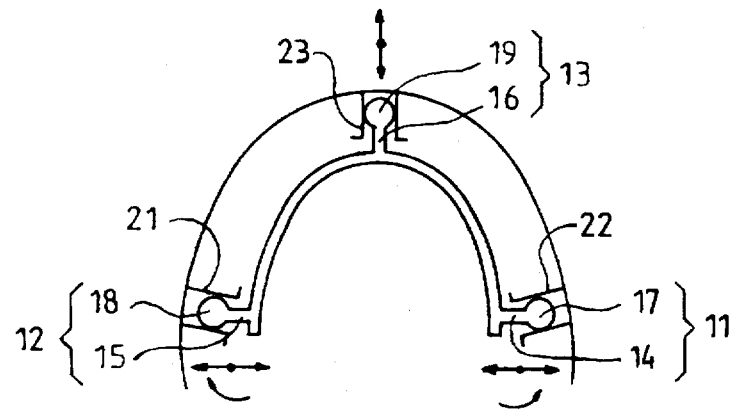
FIG.4d

HEAD EQUIPMENT WITH ISOSTATIC LINK BETWEEN SHELL AND OPTRONIC INSTRUMENTS

BACKGROUND OF THE INVENTION

1. Field of the Invention

The invention relates to the field of helmets fitted out with optical display means, for example helmets for the pilots of military aircraft.

Such helmets have a shell designed for protection against perforation. The shell is provided with an internal cladding designed to protect the pilot's head against impact. It also has a display device. These devices have the function of giving the pilot information elements in symbolic form. These information elements are superimposed in virtual form on the external scene. When these information elements represent elements that are concealed or not yet visible in the external scene, they may be shown in the real direction in which they exist with respect to a referential system linked to the earth. For this reason and for reasons of the sharpness of the image, the various components of the display device must keep a fixed position with respect to each other and with respect to the pilot's eyes.

2. Description of the Prior Art

In present-day helmets, the display device has means to project the symbolic image. The projection is done on a combiner that returns the projected image to the pilot's eyes. The projection and returning device have a collimated image for purposes of comfort. The combiner is a partially reflective surface letting through optical rays from the external scene and at least partially reflecting the image coming from the projection means. The combiner is generally formed by a part of a protection visor fitted to the helmet.

The correct position of the optronic display instruments with respect to each other and with respect to the pilot's eye is obtained during a helmet customizing stage. This stage comprising an operation for the adapting of the cladding of the helmet ensuring an accurate position of the symbolic image for the future wearer of the helmet.

It is known that the shell of the helmet, to which the optronic display instruments are fixed, changes shape under the effect of various stresses. These stresses are related, for example, to the moving apart of the lateral flanks of the shell to enable the pilot's ears to pass through when the helmet is put on, their coming closer to each other when the chin strap of the helmet is tightened or again accidental events such as impacts, maneuvering under a high load factor, the breakage of the pilot's canopy or ejection.

All these stresses tending to change the shape of the shell cause changes in the position of the components of the optronic display system.

These positional changes are detrimental to the performance characteristics of the optronic display means. To avoid such deformation or changing of shape, there are known ways, in the prior art, of providing rigidity to the mechanical elements that go into the composition of these means. Thus the projection means are now often included in rigid tubes. There is also a known way of making the shell of the helmet so as to obtain high rigidity for the interface between the mechanical elements of the display means and the shell of the helmet, and a certain degree of flexibility for the rest of the shell. This flexibility is necessary, as we have seen, for putting on the helmet. It also ensures greater resistance to impact, the changing of the shape of the shell enabling a part of the energy of this impact to be absorbed.

Despite the precautions of manufacture, the changing of the shape of the flexible parts of the shell causes the changing of the shape of the rigid part of the shell which itself applies shape-changing stresses to the mechanical parts of the optronic means.

These shape-changing stresses are passed on according to the ratio between the values of relative rigidity of the various elements in the mechanical sequence of elements going from the flexible parts of the shell to the rigid parts of this shell and to the optronic means. The need to reduce this changing of the shape of the optronic means to the minimum while retaining the shape-changing of the helmet in order to absorb the energy of the impacts leads to increasing the mass of the helmet and the mass of the mechanical elements of the optronic means. This increase in mass is itself detrimental to the pilot's comfort and safety. The heavier the head equipment, the greater is the amount of energy brought into play when the impact is a powerful one.

The present invention is aimed at enabling the necessary changing of the shape of the helmet without burdening the structure of the helmet and of the mechanical elements of the optronic system. It is aimed at totally decoupling the functions of the shell of the helmet from those of a rigid part linked to the helmet and bearing the optronic means. As a result, the shell is returned to its primary role which is that of protecting the pilot. It may therefore be made lighter. Similarly, the mechanical supporting structure of the optronic means no longer has to withstand the shape-changing strains due to the changing of the shape of the helmet. It can also be made lighter. For the pilot this means greater safety and greater wearing comfort due to the lower weight and greater ease of putting on and taking off the helmet. The invention is also aimed at improving the making of the full head equipment.

SUMMARY OF THE INVENTION

To all these ends, an object of the invention is an item of head equipment having a shell with flanks on each side of a plane of symmetry of the shell, an upper part and a rear part, and a rigid structure designed to bear optronic means, the head equipment comprising linking assemblies to attach said structure and said head to each other in a locally movable way, said linking assemblies being attached to the structure and to the shell and being capable of changing shape.

The plane of symmetry of the helmet, when the helmet is worn, is the vertical plane of symmetry of the human body. It should not be understood that the invention is applicable only to shells having a strict symmetry. The reference to the plane of symmetry is designed only to localize the various parts of the shell with respect to this plane.

In one embodiment, the linking assemblies are formed by blocks of material capable of elastically changing shape such as, for example, a rubber or an elastomer.

In a preferred embodiment, the linking assemblies are formed by pins on one part, for instance a structure, capable of sliding axially in cylinders on the other part, for instance the shell.

Thus the longitudinal changing of the shape of the elastic blocks or the sliding of the pins in the cylinders permits a relative local shifting of the shell and of the bearing structure of the optronic instruments, the entire unit preserving a constant relative position.

Preferably, the linking assemblies are placed so as to enable the most usual motions of the shell and of the bearing structure. Thus, according to a preferred embodiment, the equipment has a pin-cylinder assembly in each of the lateral flanks of the shell, a third pin-cylinder assembly with its axis located in the plane of symmetry of the shell ensuring the lateral holding of the shell-structure assembly.

This arrangement enables the moving apart of the sides of the shells when the helmet is put on or taken off. The lateral shifting of the flanks generally prompts a front-to-back shifting of the rear part of the shell and a down-to-up shifting of the upper part of the shell. This is why, preferably, the third pin-cylinder assembly will be located at the rear part of the shell or at the upper part.

The motions relating to the changing of the shape of the shell, for example, for the putting on and removal of the helmet which, for the moving parts that form the flanks, can be likened to rotational motions or to rotational and translational motions. This is why, in one embodiment, the axes of the cylinders or of the elastic blocks that are in the lateral parts are perpendicular to the axis of rotation of these parts. Inasmuch as the helmet has a symmetry with respect to a plane and inasmuch as the axes are located at one and the same level on a line with respect to a direction in front of or behind this plane, the axes of the elastic blocks are or of the lateral cylinders are preferably coplanar and have a symmetry with respect to the plane of symmetry of the shell. However, this configuration is, even in this case, not obligatory. A same result may be obtained by the fact that the pins have a part providing for contact with the cylinder in the form of a ball enabling both a sliding and a rotation of the pin. This is obtained if, for example, the part of the pin in contact with the internal wall of the cylinder has a spherical shape. The part joining the ball to the linked part (the shell or the bearing structure) then has side dimensions (perpendicular to the axis of the cylinder) that are smaller than the diameter of the cylinder so as to permit its play.

In the preferred embodiment that shall be described further below with reference to FIGS. 5 and 6, the pins are on the bearing structure and the cylinders on the shell. The converse approach could also be appropriate or again the combined approach could be taken, with pins and cylinders on one of the parts, the other part having as many cylinders as the first part has pins and as many pins as the first part has cylinders. Finally, without departing from the framework of the invention, it is possible, and on one and the same helmet, to use cylinder pin links and links with elastic blocks.

BRIEF DESCRIPTION OF THE DRAWINGS

The principle of the invention and of certain of its embodiments shall now be explained with reference to the appended drawings in which:

FIGS. 2a, 2b and 2c show the usefulness of the embodiments shown schematically in FIGS. 3a, 3b and 4a, 4b, 4c, 4d;

FIGS. 4a–4d illustrate an embodiment with an annular link;

DESCRIPTION OF THE PREFERRED EMBODIMENTS

Figure 1A:
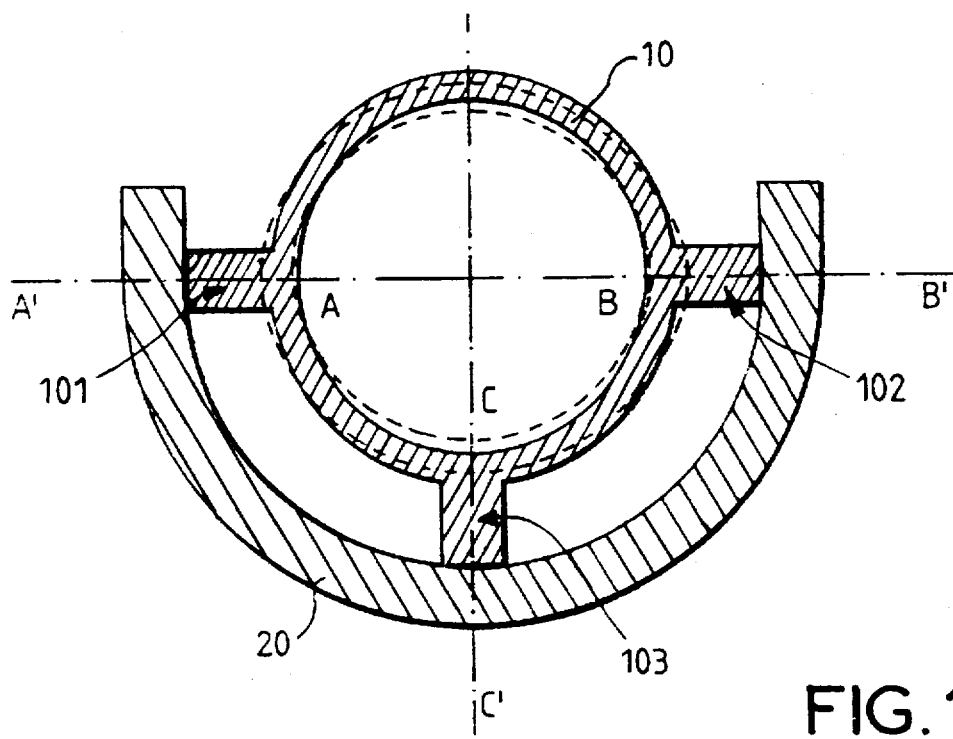
FIGS. 1a and 1b explain the principle of the invention.
Figure 1B:
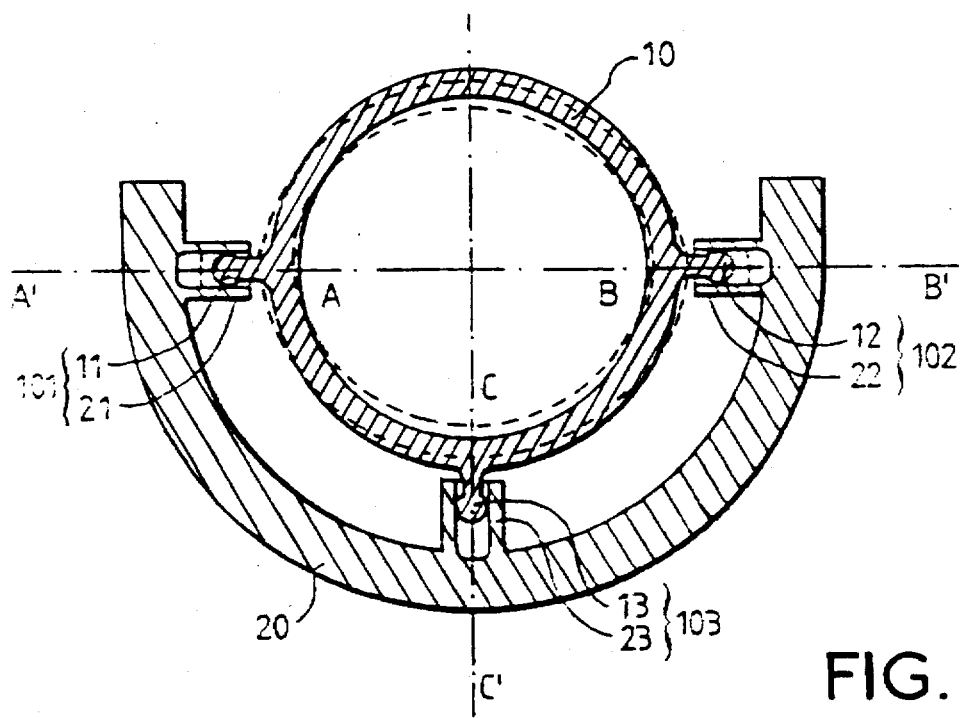

FIGS. 1a and 1b show a sectional view of three links, 101, 102, 103, between a shell 10 and a bearing structure 20.

These figure seeks to show the principle of the invention. Hence the links, as drawn, are proportionally bigger than they are in reality. In FIG. 1a, the three links are formed by elastic blocks. In FIG. 1b they are formed according to the preferred embodiment with three pins 11, 12, 13 shown herein on the shell 10 and three corresponding cylinders 21, 22, 23 shown herein on the bearing structure 20. The section is taken along a horizontal plane. The links 101, 102, 103 of FIG. 1a and the pins 11, 12, 13 of FIG. 1b are shown in two positions. A first position, shown in dashes, corresponds to the position of the shell 10 with its shape changed by the wearer's action of putting on or removing the helmet. The second position, shown in solid lines, corresponds to the resting position of the helmet. The link between the shell 10 and the bearing structure 20 is isostatic. A changing of the shape of the shell results in a changing of the shape of the blocks or a translation of the pins 11, 12, 13 in the cylinders 21, 22, 23.

In the embodiment shown in FIGS. 1a and 1b the axes AA', BB' of the blocks 101, 102 or of the cylinders 21, 22 have been shown as being colinear. They could be parallel and/or located in different horizontal or frontal planes. The axes CC' of the block 103 or of the cylinder 23 is perpendicular to the axes AA' and BB'.

FIGS. 2a, 2b and 2c give a schematic view of a shell 10 provided with cylinders 21, 22, 23 receiving pins 11, 12, 13 of a bearing structure 20.

In FIG. 2a, the shell 10 is in a resting position. In FIG. 2b, the flanks of the shell are moved apart. It can be seen that in this configuration the pins 11, 12, 13 exert stresses on the bearing structure 20 that are depicted by means of arrows. These stresses tend to change the shape of the bearing structure 20. The nature of these stresses and the place where they are exerted are shown in an enlarged detailed view in FIG. 2c.

In order to prevent this transmission of stresses, it is provided, in one embodiment, to orient the cylinders in such a way that they are each tangential to a circle centered on the rotational axis about which the part of the shell bearing the cylinder rotates during the positioning of the helmet. This embodiment is shown schematically in FIGS. 3a, 3b. In these figures in the previous ones and in the following ones, the elements having the same function bear the same reference number.

Figure 3A:
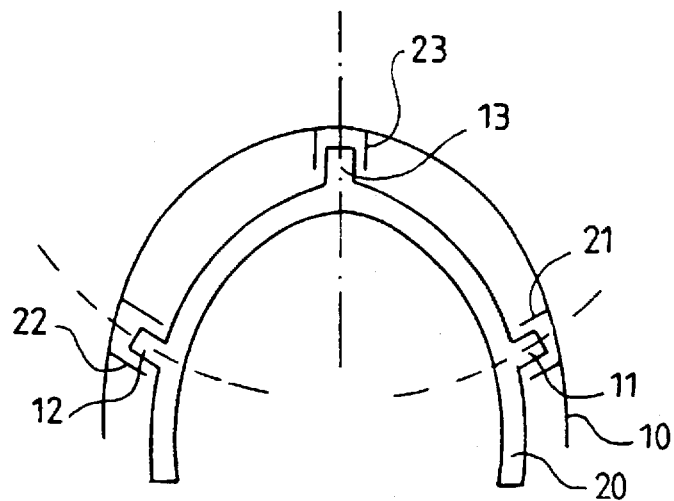
FIGS. 3a and 3b show an embodiment in which two side cylinders are perpendicular to a rotational axis of the flanks.
Figure 3B:
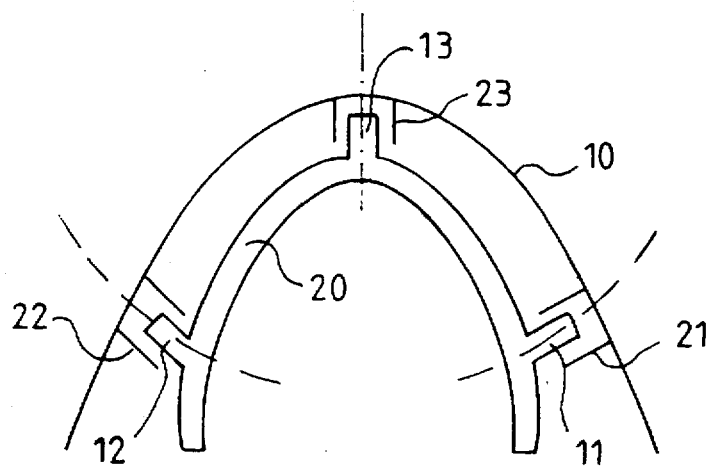

In FIG. 3a, the circles to which the axial lines of the cylinders 21, 22 are tangential have been shown in dashes.

If the relative motions are small enough, this approach is satisfactory. In this case, the pins of the flanking cylinders 21, 22 could be coplanar and symmetrical with each other in relation to the plane of symmetry of the shell, the axis of the third cylinder being perpendicular to this plane. This embodiment entails an assumption that the helmet wearer changes the shape of his helmet when putting it on or taking it off, in a regular way by moving the flanks apart always in the same way. Experience shows that this is not always the case. This is why, in the preferred embodiment, as shown in FIGS. 4a and 4b for the pin 11, the pins have the shape of a ball 17 fitted to the end of an arm 14 having a diameter smaller than that of the cylinder 21. There is thus a combination of a ball link with three degrees of freedom in rotation and one link in translation along the axis of the cylinder 21.

FIGS. 4c and 4d show a bearing structure fitted out according to the invention with pins 11, 12, 13, each pin having an arm 14, 15, 16 with a diameter smaller than that of the cylinder in which it is designed to be housed. Each of the arms ends in a ball 17, 18, 19 designed so that it can slide in the cylinder 21, 22, 23 into which it is designed to fit.

FIG. 4c shows a bearing structure 20 and the shell 10 assembled with an isostatic assembly having three pins fitted with balls.

FIG. 4d shows this same assembly while the shell 10 is subjected to shape-changing stresses for the putting on or removal of the helmet. The balls 17, 18 of the flanks enables the translational and rotational shape-changing of the shell 10 without exerting any stress on the bearing structure 20. The shape of the upper pin 13 wherein it has a ball is not indispensable since the shell 10 is not subjected to stresses at the upper cap except in translation.

Figure 5:
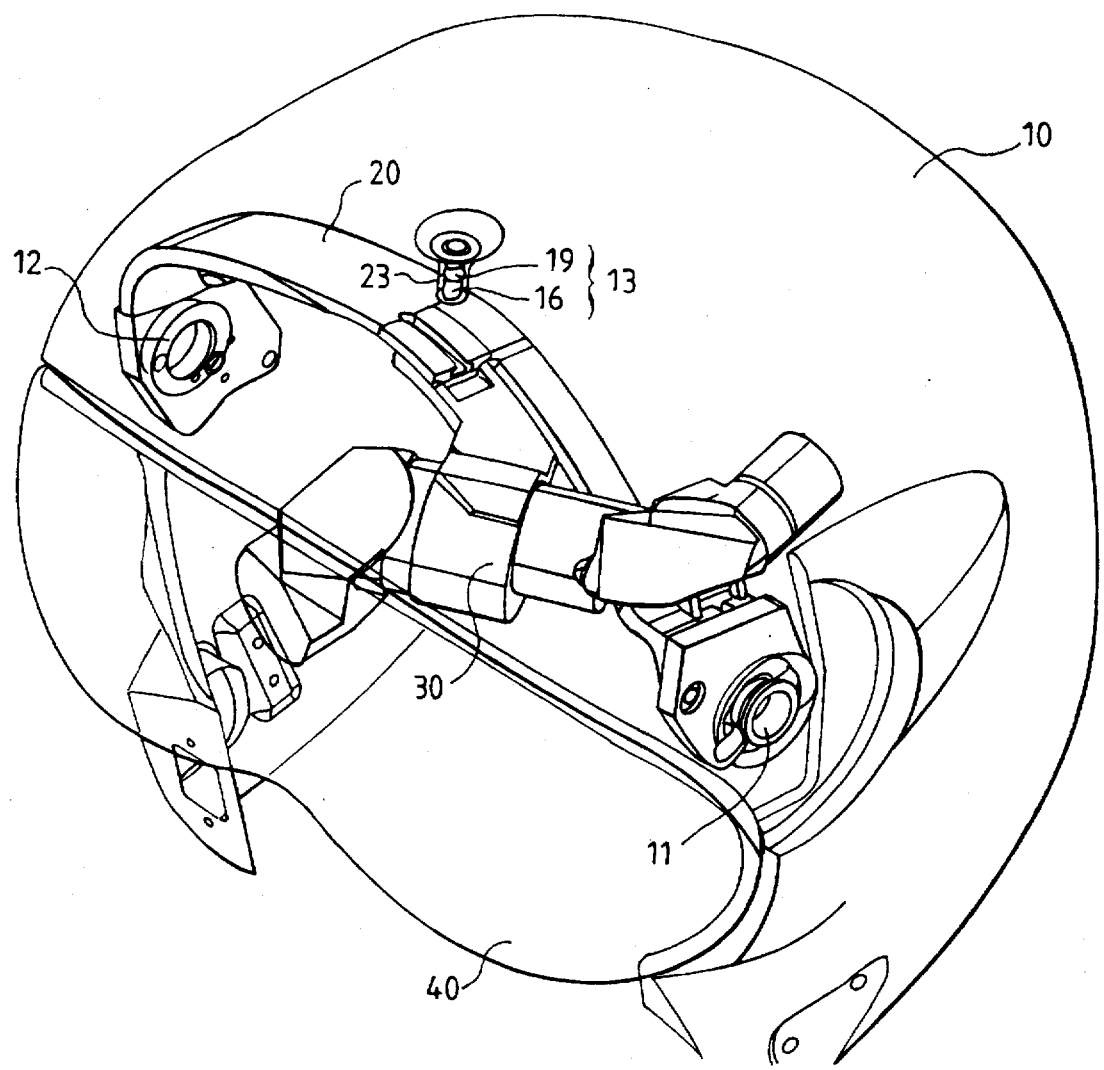
FIG. 5 shows a view in perspective of a helmet made according to a preferred embodiment of the invention.

In order to enable an improved understanding of the way in which the shell, the bearing structure and the optronic equipment are integrated, FIG. 5 shows a view in perspective of a piece of head equipment including a preferred embodiment of the invention and comprising a bearing structure 20 of an optronic instrument 30.

The bearing structure 20 is included within a shell 10. Three mechanical links of the same nature 101, 102, 103, two flanking links 101 and 102 and one upper cap link 103 provide for the assembling of the bearing structure 20 and the shell 10. The cap link 103 has been shown as if it were transparent so as to reveal a pin 13 comprising an arm 16 going beyond the bearing structure 20 and ending in a spherical part 19. This sphere 19 slides in a bore-hole 23 in the shell 10. The visor 40 of the helmet and the optronic device 30 which are known per se shall not be described.

Figure 6A:
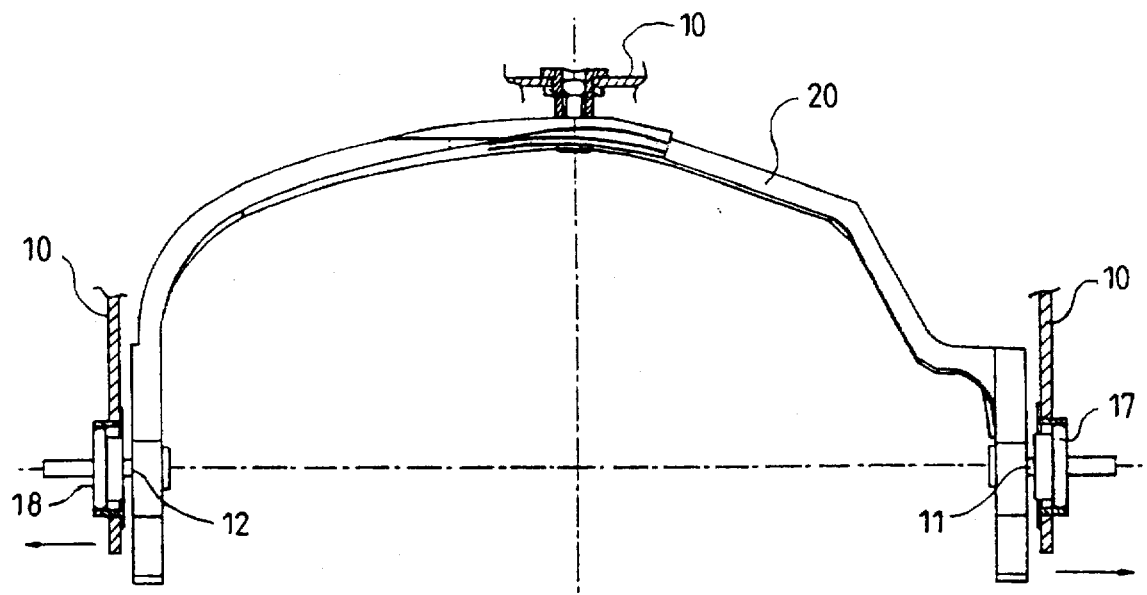
FIGS. 6a and 6b show a sectional view of a bearing structure and its link with the shell according to the preferred embodiment.

FIG. 6a shows a sectional view of the helmet of FIG. 5. The sectional plane is the coplanar plane of the axes of the cylinders and of the pins 11, 21, 12, 22, 13, 23.

Figure 6B:
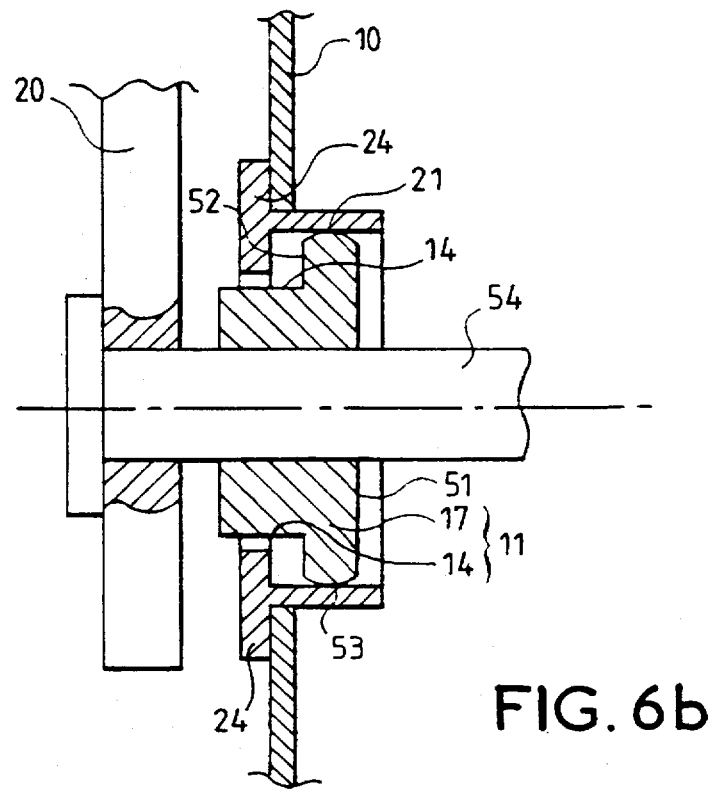

FIG. 6a shows the bearing structure 20 and the shell 10. It also shows the particular shape of the balls 17, 18 of the side links 101, 11, 21; 102, 12, 22 one of which is shown in an enlarged form in the detailed view of FIG. 6b. The ball 17 has the shape of a sphere truncated by two planes 51, 52, symmetrical to a diametrical plane of the sphere. The arm 14 is cylindrical and its axis is perpendicular to the planes 51, 52 of the truncation of the sphere. The rounded side part of the ball 17 slides in a cylinder 21. This cylinder is partially blocked by a ring-shaped part 24 whose axis is the axis of the cylinder 21. The internal diameter of the ring 24 is greater than the diameter of the arm 14 of the pin 11 and smaller than the diameter of the cylinder 21. This fact, associated with the spherical shape of the lateral part of the ball 17 in contact with the cylinder 21, enables the rotation and translation of the shell 10 about the pin 11. The limit stop 24 stops the changing of the shape of the shell in the event of ejection.

At the time of ejection, the shell tends to expand under the effect of the relative wind. At this time, the plane surface 52 of the ball 17 comes into contact with the limit stop 24.

The bearing structure 20 then plays a part, in this exceptional case, in maintaining the rigidity of the shell 10.

The balls 21–23 and at least the parts 53 of the balls 17 in contact with the bores are made of plastic materials (such as Teflon) that have a low coefficient of friction and withstand wear and tear.

What is claimed is:

1. Head equipment onto which an optronic means is mounted, the head equipment having a shell with flanks on each side of a plane of symmetry of the shell, an upper part and a rear part, and a rigid structure, the head equipment comprising linking assemblies to attach said rigid structure and said shell to each other in a locally movable way, said linking assemblies being attached to the rigid structure and to the shell, said linking assemblies comprising pins which are attached to one of said shell or said rigid structure and cylinders which are attached to the other of said shell or said rigid structure, said pins being axially slidable within said cylinders.

2. Head equipment according to claim 1, comprising three of said linking assemblies, two of said linking assemblies being located in each of the flanks of the shell and a third of said linking assemblies being located at the plane of symmetry of the head equipment.

3. Head equipment according to claim 1, wherein the linking assemblies are formed by a material which is capable of elastically changing shape.

4. Head equipment according to claim 1, wherein at least one of said pins comprises a ball-shaped part which permits a sliding and relative rotation of the pin with reference to the cylinder.

5. Head equipment according to claim 4, wherein axial lines of a first two of said cylinders are coplanar and an axial line of a third cylinder of said cylinders is perpendicular to a plane determined by the first two cylinders.

6. Head equipment according to claim 4, wherein axial lines of a first two of said cylinders are merged and an axial line of a third cylinder of said cylinders is perpendicular to a common axial line of the first two cylinders.

7. Head equipment according to claim 4, wherein at least one pin of said pins has an arm with lateral dimensions smaller than a diameter of the cylinder, said arm bearing the ball-shaped part.

8. Head equipment according to claim 7, wherein the at least one ball-shaped part has a spherical shape truncated by two planes symmetrical to a diametrical plane of the sphere.

9. Head equipment according to claim 7, wherein one end of the cylinder is blocked by a limit stop comprising a bore-hole crossed by the arm, a diameter of the bore-hole being smaller than a diameter of the cylinder and greater than a diameter of the arm.

10. Head equipment according to any one of the claims 4–6 and 8–10, wherein at least the upper and rear parts in contact with the pins and with the cylinders are made of plastic.

11. A helmet comprising:
    a shell part and a bearing structure; and
    at least one linking means for attaching said shell part to said bearing structure, said linking means comprising a first part which is attached to one of said shell part or said bearing structure and a second part which is attached to the other of said shell part or said bearing structure, said first part being axially slidable within said second part.

12. A helmet according to claim 11, wherein said first part is a pin having a ball-shaped part, and said second part is a cylinder, such that said ball-shaped part is rotatable within said cylinder and slidable along an axis of said cylinder.

* * * * *